Patented Aug. 13, 1946

2,405,666

UNITED STATES PATENT OFFICE 2,405,666

WELDING

Stanley M. Norwood, Great Neck, N. Y., assignor to Electro Metallurgical Company, a corporation of West Virginia No Drawing. Application May 6, 1944, Serial No. 534,528

9 Claims. (Cl. 219—8)

This invention relates to welding, referring more particularly to welded steel structures.

In the fabrication of structures by fusion-deposition welding the conditions under which welding must be accomplished are dictated by the position, size and shape of the structures. Often, welding must be conducted under extremely adverse circumstances, for example under such conditions that the expansion and contraction of metal at the weld zones are severely restrained. Because of the intense heat locally applied in welding, large stresses are induced in weld zones. If welded members are rigidly fixed in position during welding so as to restrain expansion and contraction of metal at the weld zone, these stresses are locked up in the completed welds. Locked-up stresses often cause cracking in weld zones, either in weld-deposited metal or in the plate.

An instance of a particularly difficult application of welding is the welding-on of armor plate to ships and tanks and the like. Welding conditions in these operations are unusually adverse. The material to be welded is of high strength, the welds produced are under severe restraint, and conditions are usually such that no heat treatment of weld zones either before or after welding is possible to minimize stress formation or to relieve stresses.

The consistent production of sound, crack-free welds in this type of work under these conditions presents many difficulties which have not been satisfactorily overcome in the past. Thus, although special welding techniques have been devised for minimizing locked-up stresses, such techniques have not proved uniformly successful in preventing cracks. Similarly the use of special alloys, such as austenitic iron-chromium-nickel alloys, as weld filler material for fusion-deposition welding high-strength steel members in which weld zones are restrained, although providing some improvement, is not always sufficient to prevent cracking. Because of the extremely high stresses locked up in welds made under these circumstances, slight variation in welding technique or composition of the plate or weld filler material may lead to crack formation even when the iron-chromium-nickel alloys are used.

Since welding conditions for structural welding can not be altered to suit the needs of a given welding process, whether or not welding can be employed in such cases depends on whether or not the process can be so conducted as to produce satisfactory results despite unfavorable welding conditions. The many advantages of welding as a construction tool give impetus to demands for its use in increasingly numerous and increasingly difficult applications, yet as indicated, the problem of producing sound, crack-free welds by fusion-deposition welding under conditions wherein the welds are restrained has not been completely solved.

It is the principal object of this invention to provide a solution to this problem. More specifically, it is an object of the invention to provide welded structures composed of high strength steel and containing restrained but crack-free fusion-deposition welds. Another object is an improved welding rod particularly well suited for use in the production of welds subject to restraint.

The invention by means of which these objects are attained comprises a method of welding steel members by fusion-depositing thereon a weld filler material composed of a high-chromium austenitic iron-base alloy containing an effective amount between about 0.05% and 0.25%, preferably 0.15% to 0.22%, vanadium. The weld filler material may contain 10% to 30% chromium, 4% to 30% nickel, 0.5% to 7% manganese, 0.05% to 0.25% vanadium, up to about 0.5% (preferably up to about 0.3%) carbon, the remainder iron and incidental impurities. Nitrogen in a proportion up to 0.2% may be present, the higher chromium materials tolerating more nitrogen than the lower chromium materials, but the ratio of chromium to nitrogen should not be less than about 130 to 1. Columbium, in a proportion up to 10 times the carbon content, is a useful ingredient. In materials containing columbium the carbon content should not exceed 0.3%, and no more than 0.1% nitrogen should be present. Generally, the manganese content may decrease as the nickel content increases, and manganese need not exceed about 5% if the nickel content is 5% or more. A preferred lower limit of manganese is 1.5%. The invention also includes a welded structure comprising steel members joined by at least one weld, the weld or welds containing fusion-deposited weld filler metal of this composition, and a specific embodiment of the invention is a welding rod composed of an alloy of this composition.

Specific examples of suitable weld filler materials for use in accordance with the invention are set forth in the following table, the remainder in each case being substantially all iron and up to 0.5% carbon.

| Chromium | Nickel | Manganese | Vanadium |
|---|---|---|---|
| Per cent | Per cent | Per cent | Per cent |
| 12 to 20 | 4 to 10 | 0.5 to 7 | 0.05 to 0.25 |
| 15 to 25 | 4 to 15 | 0.5 to 5 | 0.05 to 0.25 |
| 20 to 30 | 10 to 25 | 0.5 to 5 | 0.05 to 0.25 |

These materials may also contain nitrogen with or without columbium in the proportions above set forth.

An extremely severe test for determining the suitability of weld filler materials for use in the production of restrained welds has been devised and is known as the "torture test." In this test a slot with closed ends is prepared in a heavy plate, usually armor plate 1½ to 2 inches thick, and the plate is welded to a heavier metal base, for example a slab about 4 inches thick, which is considerably longer and wider than the slotted plate. Weld metal is then deposited in the slot, usually in a plurality of passes. No preheating or post heating is permitted. The weld-deposited metal in the slot is restrained by the surrounding plate, and the plate itself is anchored so that it can neither move nor bend. Under these conditions large residual stresses are locked up in the weld. If upon examination of the weld zone after cooling, cracks are found in either the deposited metal or plate, the weld is unsatisfactory.

Sound, crack-free welds are consistently produced in the torture test by the practice of the invention using weld filler materials composed of austenitic iron-chromium-nickel-manganese alloys containing 0.05% to 0.25% vanadium. Welds produced using otherwise similar weld filler materials free from vanadium often crack in the torture test. In one series of tests, torture test welds were made in accordance with the invention by electric arc welding using iron-base weld filler material containing about 20% chromium, 10% nickel, 4% manganese, 0.05% nitrogen, and 0.15% carbon with vanadium contents ranging from 0.05% to 0.25%. In every instance, crack-free welds were produced, whereas in similar tests using weld filler materials entirely similar but containing no vanadium, cracking was frequently evident both in deposited metal and in the plate.

The invention is particularly applicable for example to the fabrication of massive structures composed of high-strength nonaustenitic steels in which structures the individual members are rigidly fixed in position, either by their very massiveness or by attachment to other, anchoring, members, so that the members and the completed welds are rigidly restrained. Sound, strong welds, either fillet welds or butt welds, are consistently produced by the invention under these adverse conditions. Crater cracks frequently found in welds produced by electric arc welding methods are substantially eliminated by the invention.

The invention may be practiced by the use of a welding rod in which all of the constituents of the weld deposit are alloyed or, if desired, the ordinary austenitic iron-chromium-nickel welding rods containing 10% to 30% chromium, 4% to 30% nickel, 0.5% to 7% manganese and up to 0.5% carbon available on the market may be provided with a coating containing sufficient vanadium to produce an austenitic iron-chromium-nickel alloy deposit containing 0.05% to 0.25% vanadium. The vanadium employed in the coating may suitably be in the form of vanadium alloys or compounds. If vanadium oxides are employed, the coating should contain a reducing agent such as silicon or aluminum to aid in the reduction and deposition of vanadium.

I claim:

1. A welded structure comprising at least two high strength steel members joined together by fusion-deposited weld metal, said weld metal having been severely restrained from normal contraction on cooling and being composed of a substantially austenitic alloy containing 10% to 30% chromium; 4% to 30% nickel; 0.5% to 7% manganese; 0.01% to 0.5% carbon; 0.05% to 0.25% vanadium; remainder iron and incidental impurities, said vanadium rendering to said weld metal substantial immunity from the cracking normally encountered in weld metal fusion-deposited under such conditions.

2. A welded structure comprising at least two high strength steel members joined together by fusion-deposited weld metal, said weld metal having been severely restrained from normal contraction on cooling and being composed of a substantially austenitic alloy containing 10% to 30% chromium; 6% to 30% nickel; 0.05% to 5% manganese; 0.01% to 0.05% carbon; 0.05% to 0.25% vanadium; remainder iron and incidental impurities, said vanadium rendering to said weld metal substantial immunity from the cracking normally encountered in weld metal fusion-deposited under such conditions.

3. A welded structure comprising at least two high strength steel members joined together by fusion-deposited weld metal, said weld metal having been severely restrained from normal contraction on cooling and being composed of a substantially austenitic alloy containing 10% to 30% chromium; 6% to 30% nickel; 1.5% to 5% manganese; 0.01% to 0.3% carbon; 0.15% to 0.22% vanadium; remainder iron, said vanadium rendering to said weld metal substantial immunity from the cracking normally encountered in weld metal fusion-deposited under such conditions.

4. A welded structure comprising at least two high strength steel members joined together by fusion-deposited weld metal, said weld metal having been severely restrained from normal contraction on cooling and being composed of a substantially austenitic alloy containing 15% to 25% chromium; 4% to 15% nickel; 1.5% to 5% manganese; 0.01% to 0.3% carbon; 0.15% to 0.22% vanadium; remainder iron, said vanadium rendering to said weld metal substantial immunity from the cracking normally encountered in weld metal fusion-deposited under said conditions.

5. A welding rod composed of a substantially austenitic iron-chromium-nickel alloy containing 10% to 30% chromium; 4% to 30% nickel; 0.5% to 7% manganese; 0.01% to 0.5% carbon; 0.05% to 0.25% vanadium; remainder substantially all iron.

6. A welding rod composed of a substantially austenitic iron-chromium-nickel alloy containing 10% to 30% chromium; 6% to 30% nickel; 0.5% to 5% manganese; 0.01% to 0.5% carbon;

0.05% to 0.25% vanadium; remainder iron and incidental impurities.

7. A welding rod composed of a substantially austenitic iron-chromium-nickel alloy containing 15% to 25% chromium; 4% to 15% nickel; 1.5% to 5% manganese; 0.01% to 0.3% carbon; 0.15% to 0.22% vanadium, columbium in an effective proportion up to about ten times the carbon content, remainder iron.

8. A welding rod composed of a substantially austenitic iron-chromium-nickel alloy containing 10% to 30% chromium; 4% to 30% nickel; 0.5% to 7% manganese; 0.05% to 0.25% vanadium; 0.01% to 0.5% carbon; the remainder, except for fluxing materials, iron and incidental impurities.

9. A welding rod composed of a substantially austenitic iron-chromium-nickel alloy containing 10% to 30% chromium; 6% to 30% nickel; 0.5% to 5% manganese; 0.05% to 0.25% vanadium; 0.01% to 0.3% carbon; the remainder, except for fluxing materials, iron and incidental impurities.

STANLEY M. NORWOOD.